US012717299B2

(12) United States Patent
Woodford

(10) Patent No.: US 12,717,299 B2
(45) Date of Patent: Aug. 25, 2026

(54) SYSTEM FOR INSTALLING, OPERATING AND CONFIGURING AFTERMARKET VEHICLE SAFETY SYSTEMS

(71) Applicant: Australian Mitigation Engineering Developments Pty Ltd, Queensland (AU)

(72) Inventor: Peter Woodford, Queensland (AU)

(73) Assignee: Australian Mitigation Engineering Developments Pty Ltd, Queensland (AU)

( * ) Notice: Subject to any disclaimer, the term of this patent is extended or adjusted under 35 U.S.C. 154(b) by 142 days.

(21) Appl. No.: 18/576,926

(22) PCT Filed: Jun. 7, 2022

(86) PCT No.: PCT/AU2022/050705
§ 371 (c)(1),
(2) Date: Jan. 5, 2024

(87) PCT Pub. No.: WO2023/279158
PCT Pub. Date: Jan. 12, 2023

(65) Prior Publication Data
US 2024/0420522 A1 Dec. 19, 2024

(30) Foreign Application Priority Data
Jun. 7, 2021 (AU) ................................ 2021902058

(51) Int. Cl.
*G05B 19/05* (2006.01)
*B60R 16/023* (2006.01)
*H04L 12/46* (2006.01)

(52) U.S. Cl.
CPC .......... *G05B 19/058* (2013.01); *B60R 16/023* (2013.01); *H04L 12/46* (2013.01)

(58) Field of Classification Search
CPC ....... G07C 5/0825; B60R 16/023; G06F 8/65; G05B 19/058; H04L 12/46
(Continued)

(56) References Cited

U.S. PATENT DOCUMENTS 7,859,392 B2 * 12/2010 McClellan ....... G08G 1/096791 340/936
8,781,442 B1 * 7/2014 Link, II .................... H04L 9/30 370/338
(Continued)

FOREIGN PATENT DOCUMENTS

DE 102014219232 A1 * 4/2015 ........... G07C 5/0808
JP 2020147250 A 9/2020

OTHER PUBLICATIONS

W. Xue, B. Yang, T. Kaizuka and K. Nakano, "A Fallback Approach for an Automated Vehicle Encountering Sensor Failure in Monitoring Environment," 2018 IEEE Intelligent Vehicles Symposium (IV), Changshu, China, 2018, pp. 1807-1812, doi: 10.1109/IVS.2018.8500392. (Year: 2018).*
(Continued)

*Primary Examiner* — Erin D Bishop
*Assistant Examiner* — Keith A von Volkenburg
(74) *Attorney, Agent, or Firm* — ICE MILLER LLP; Justin D. Swindells

(57) ABSTRACT

A system for installing, operating and configuring aftermarket vehicle monitoring devices in a vehicle. The system includes a controller having connection interfaces corresponding to data communication protocols for connecting to one or more vehicle monitoring devices of a vehicle. A memory stores instructions to process inputs received from the vehicle monitoring device(s) and to generate outputs based on the inputs. The controller is configured to receive
(Continued)

commands from a remote device to configure the vehicle monitoring device(s) connected to the controller.

18 Claims, 2 Drawing Sheets

(58) Field of Classification Search
USPC .......................................................... 701/29.6
See application file for complete search history.

(56) References Cited

U.S. PATENT DOCUMENTS

| | | | | |
|---|---|---|---|---|
| 9,424,751 | B2 | 8/2016 | Hodges et al. | |
| 9,720,680 | B2 | 8/2017 | Diedrich et al. | |
| 10,023,117 | B2 | 7/2018 | Ricci | |
| 10,140,783 | B2 | 11/2018 | Thornburg et al. | |
| 10,402,184 | B2 * | 9/2019 | Rockwell | G06F 21/57 |
| 10,522,033 | B2 | 12/2019 | McClellan et al. | |
| 10,960,838 | B2 | 3/2021 | Sobhany | |
| 11,397,801 | B2 * | 7/2022 | Ben-Noon | H04L 63/1425 |
| 11,450,154 | B2 * | 9/2022 | Merg | G05B 19/042 |
| 11,721,137 | B2 * | 8/2023 | Fang | G07C 5/0816<br>701/31.5 |
| 12,037,015 | B2 * | 7/2024 | Xiang | B60W 50/0205 |
| 2014/0309839 | A1 * | 10/2014 | Ricci | B60R 25/00<br>701/25 |
| 2017/0349148 | A1 | 12/2017 | Bojanowski et al. | |
| 2019/0381860 | A1 | 12/2019 | Credo et al. | |
| 2020/0050442 | A1 | 2/2020 | Sakurai et al. | |

OTHER PUBLICATIONS

Extended European Search Report issued in corresponding Application No. 22836399.0 mailed Apr. 16, 2025.

Japanese Office Action issued in corresponding Application No. 2024-501153 mailed Jun. 2, 2025.

International Search Report and Written Opinion issued in corresponding Application No. PCT/AU2022/050705 mailed Aug. 30, 2022.

* cited by examiner

SYSTEM FOR INSTALLING, OPERATING AND CONFIGURING AFTERMARKET VEHICLE SAFETY SYSTEMS

CROSS-REFERENCE TO RELATED APPLICATIONS

This application is a 371 national phase application of International Application No. PCT/AU2022/050705, filed on Jul. 6, 2022, which published in the English language on Jan. 12, 2023, under International Publication No. WO 2023/279158 A1, which claims priority to Australia Patent Application No. 2021902058, filed on Jul. 6, 2021. Each disclosure is incorporated herein by reference in its entirety.

TECHNICAL FIELD

The present invention relates a system and method for installing, operating and configuring aftermarket vehicle safety systems and for adding one or more aftermarket safety systems to a vehicle.

BACKGROUND

Any references to methods, apparatus or documents of the prior art are not to be taken as constituting any evidence or admission that they formed, or form part of the common general knowledge.

There are many vehicle safety systems available for and built into modern vehicles.

These vehicle safety systems are generally separate systems that are manufactured by separate suppliers. Each may have a separate method of fixing to a vehicle, a separate method of operating, a separate method of providing input and output data, and a separate method of monitoring.

These disparate safety systems lead to several limitations. Several different communications protocols may be used. For example, one safety system may have its own sensors, controller box and in-vehicle display that are incompatible with the sensors, controller box and display of a second safety system in the same vehicle.

Further, the software and firmware used in the control box to control the respective safety devices is likely to be proprietary to its manufacturer and is 'closed' in that it is unlikely that it can be easily upgraded or changed.

Where several vehicle safety devices are added to a vehicle, such limitations quickly result in the installation and use of such multiple and separate vehicle safety systems becoming inefficient, wasteful, costly, and environmentally unsustainable.

SUMMARY OF INVENTION

In an aspect, the invention provides a system for installing, operating and configuring aftermarket vehicle safety systems comprising:

- a controller located in a housing, the controller including:
  - a plurality of connection interfaces corresponding to data communication protocols for connecting to one or more vehicle monitoring devices of a vehicle; and
  - a memory storing instructions executable by a processor of the controller to process inputs received from the one or more vehicle monitoring devices and generate outputs based on the inputs, wherein the controller is configured to receive commands from a remote device to configure the one or more vehicle monitoring devices connected to the controller; and
- a single display connected to the controller, wherein the display is adapted to be located in a vehicle and display information in response to the outputs from the controller.

Preferably, the vehicle monitoring devices are aftermarket vehicle monitoring devices. Preferably, the vehicle monitoring devices are a combination of aftermarket vehicle monitoring devices and OEM vehicle monitoring devices.

Preferably, the single display comprises an aftermarket or non-OEM (Original Equipment Manufacturer) display to be installed in the vehicle. Preferably, the single display is the only display connected to the controller. Preferably, only one display is connectable to the controller at any one time.

Preferably, the controller is further configured to generate outputs based on the inputs to control the vehicle. Preferably, the controller is configured to generate outputs based on the inputs to control one or more components of the vehicle.

Preferably, the plurality of connection interfaces comprise one or more of an RS232 connection, a Bluetooth® (short-range wireless communication)_receiver, a CAN Bus, a Wi-Fi receiver, a digital I/O, an analog I/O, and an ethernet connection.

Preferably, the inputs comprise data including electronic signals generated by the one or more vehicle monitoring devices. Preferably, the inputs comprise data generated by the one or more vehicle monitoring devices based on a function of the one more vehicle monitoring devices. Preferably, the controller is configured to timestamp and/or geotag the inputs upon receipt thereof.

Preferably, the controller comprises a CAN Bus interface for connecting to the vehicle. Preferably, the controller comprises a CAN Bus interface for connecting to OEM systems of the vehicle.

Preferably, the controller is configured to connect to both a vehicle CAN Bus and aftermarket (non-OEM) vehicle monitoring devices.

Preferably, the controller is configured to network the one or more vehicle monitoring devices together.

Preferably, the controller stores the inputs from the one or more vehicle monitoring devices and the outputs in the memory and/or wirelessly transmits the inputs from the one or more vehicle monitoring devices and the outputs to a telematics hub.

Preferably, in response to connection of an additional vehicle monitoring device, the controller is configured to obtain instructions executable by the processor of the controller to process inputs received from the additional vehicle monitoring device and generate outputs based on the inputs. Preferably, in response to connection of an additional vehicle monitoring device, the controller is configured to wirelessly obtain instructions executable by the processor of the controller to process inputs received from the additional vehicle monitoring device and generate outputs based on the inputs.

Preferably, the display comprises a human-machine interface.

Preferably, the outputs comprise at least one of a status corresponding to the one or more vehicle monitoring devices, an alert, an audible warning generated by a speaker in the single in-cabin display and a visual warning displayed on the display.

Preferably, the outputs displayed on the single display are user interactive.

Preferably, the controller is further configured to wirelessly receive commands from the remote device to update firmware and/or software of the one or more vehicle monitoring devices connected to the controller.

Preferably, the remote device provides the commands wirelessly or through a wired connection.

Preferably, the one or more vehicle monitoring devices are safety devices and/or mitigations devices for monitoring a state of a vehicle and vehicle components and/or an area about a vehicle and/or a state of a driver.

Preferably, the vehicle monitoring devices comprise one or more of: a radar sensor, a brake pressure sensor, a driver fatigue monitor, a seat switch, a door switch, video cameras, a GNSS receiver, an air quality monitor, an RFID scanner and a tyre monitoring system.

Preferably, the controller is configured to record the data generated by the vehicle monitoring devices. Preferably, the data includes actions and events detected by the one or more vehicle monitoring devices.

Preferably, the controller includes a battery to maintain an internal system clock. Preferably, the battery is a rechargeable battery adapted to recharge upon ignition of a battery of the vehicle. Preferably, the rechargeable battery receives electrical charge from the battery of the vehicle.

In another aspect, the invention provides a vehicle monitoring system comprising:

- a vehicle having one or more vehicle monitoring devices connected thereto for monitoring various aspects of the vehicle and its surroundings;
- a controller located in a housing, the controller including:
  - a plurality of connection interfaces corresponding to data communication protocols connected to the one or more vehicle monitoring devices of a vehicle; and
  - a memory storing instructions executable by a processor of the controller, wherein the processor receives inputs from the one or more vehicle monitoring devices and generates outputs based on the inputs and communicates the outputs to a secondary device, and
- wherein the controller receives commands from a remote device to configure the one or more vehicle monitoring devices connected to the controller; and
- a display connected to the controller, wherein the display is located in the vehicle and displays information in response to the outputs from the controller.

In another aspect, the invention provides a method of installing, operating and configuring aftermarket vehicle monitoring devices in a vehicle, the method including:

- providing a controller including a plurality of connection interfaces corresponding to data communication protocols for connecting to a plurality of vehicle monitoring devices of the vehicle, and a memory storing instructions executable by a processor of the controller to process inputs received from the plurality of vehicle monitoring devices and generate outputs based on the inputs;
- providing a single display connected to the controller, wherein the display is located in a vehicle and displays information from each of the one more vehicle monitoring devices in response to the outputs from the controller;
- connecting the controller to the plurality of vehicle monitoring devices;
- connecting the controller to a vehicle network of the vehicle;
- receiving commands from a remote device to configure the one or more vehicle monitoring devices connected to the controller;
- receiving inputs from the plurality of vehicle monitoring devices;
- processing the inputs and generating outputs based on the inputs; and
- displaying information on the single display based on the outputs.

Preferably, the method includes initialising the controller upon ignition of the vehicle.

Preferably, the method includes loading instructions from the memory into the controller after initialising the controller. Preferably, the initialisation and loading of instructions is recorded in the memory.

Preferably, following initialisation, the controller attempts to establish a connection with a remote server. Preferably, upon connection with the remote server, the controller performs a check for configuration updates, firmware update and/or time adjustments.

Preferably, the controller scans for vehicle monitoring devices specified in a configuration specification connected to the controller. Preferably, the controller identifies any vehicle monitoring devices specified in the configuration specification not connected to the controller and generates an error message that is stored in the memory and output to the single display.

Preferably, upon identifying any vehicle monitoring devices specified in the configuration specification not connected to the controller, the controller excludes the identified vehicle monitoring devices specified in the configuration specification not connected to the controller from operation, reads action rules stored in the memory for the vehicle monitoring devices specified in the configuration specification connected to the controller and polls the vehicle monitoring devices specified in the configuration specification connected to the controller. Preferably, during polling, the controller reads a state of each vehicle monitoring device, compares the state to trigger conditions specified in the configuration specification, and determines whether an output action is required based on the comparison. Preferably, if the controller determines an output action is required, the controller references the configuration specification, determines the output action, records the output action in the memory, and controls one or more of the plurality of vehicle output systems to generate an output.

Preferably, the method includes checking an ignition status of the vehicle. Preferably, the method includes checking an ignition status of the vehicle at predetermined intervals. Preferably, if the ignition status of the vehicle indicates an off status, the controller records the off status in the memory and initiates a power saving mode. Preferably, the power saving mode includes disabling one or more outputs, disabling the single display, and/or placing the controller in a sleep mode with a periodic wake schedule. Preferably, if the ignition status of the vehicle indicates an on status, the controller records the off status in the memory and disables power saving mode.

Preferably, the method includes checking a voltage of a battery of the vehicle. Preferably, the method includes checking a voltage of a battery of the vehicle at predetermined intervals. Preferably, if the voltage of the battery of the vehicle is below a threshold value, the controller is disabled.

BRIEF DESCRIPTION OF THE DRAWINGS

Preferred features, embodiments and variations of the invention may be discerned from the following Detailed Description which provides sufficient information for those skilled in the art to perform the invention. The Detailed Description is not to be regarded as limiting the scope of the preceding Summary of the Invention in any way. The Detailed Description will make reference to a number of drawings as follows.

DETAILED DESCRIPTION OF PREFERRED EMBODIMENTS

Figure 1:
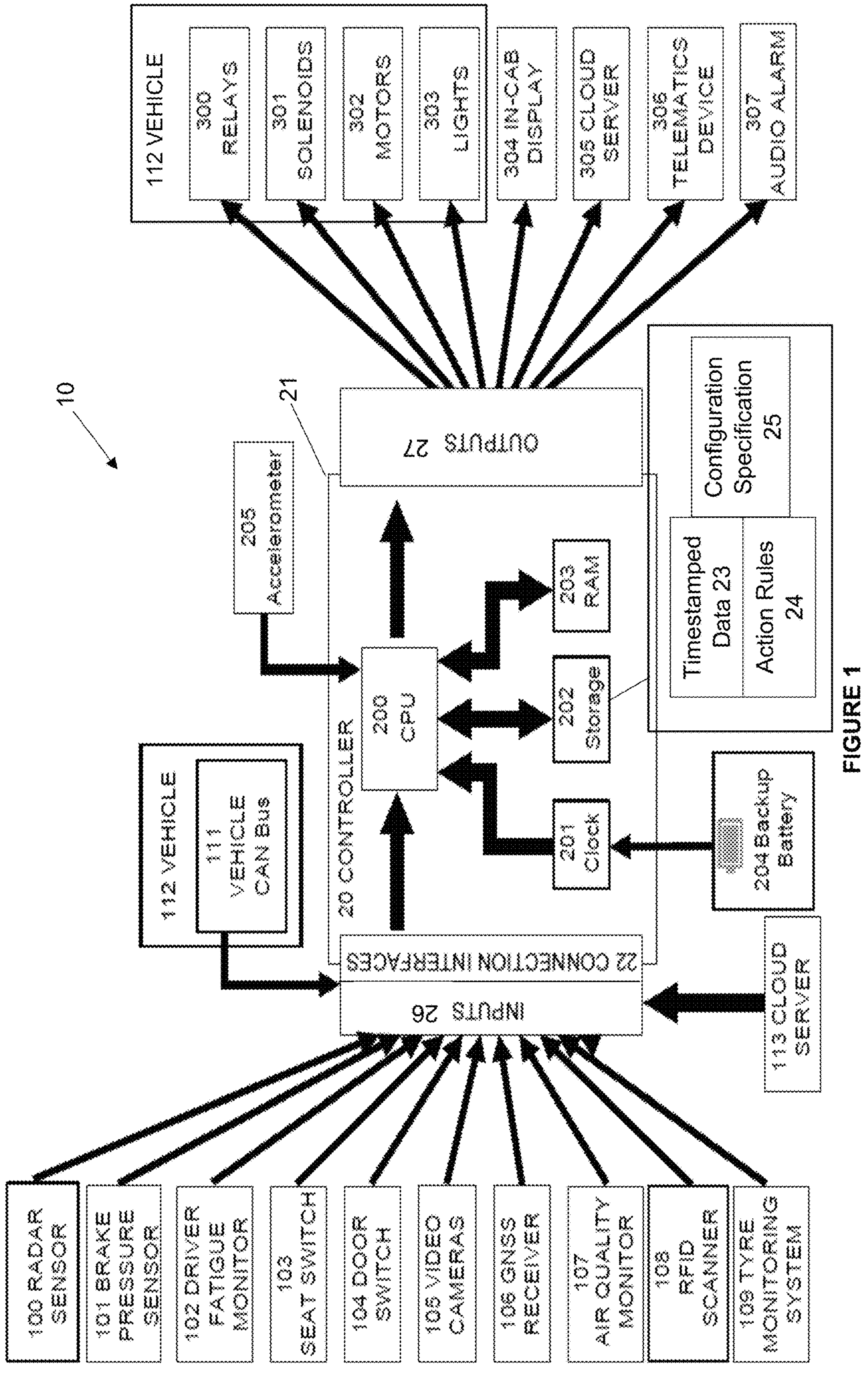
FIG. 1 illustrates a system for installing, operating and configuring aftermarket vehicle safety systems according to an embodiment of the present invention.

FIG. 1 illustrates a system 10 for installing, operating and configuring aftermarket vehicle safety systems.

The system 10 includes a controller 20 located in a housing 21. The controller 20 includes a plurality of connection interfaces 22 corresponding to data communication protocols for connecting to one or more vehicle monitoring devices 100-109 of a vehicle 112, and a memory 202 storing instructions executable by a processor 200 of the controller 20 to process inputs 26 received from the one or more vehicle monitoring devices 100-109 and generate outputs 27 based on the inputs 26, wherein the controller 20 is configured to receive commands from a remote device in the form of a cloud server 113 to configure the one or more vehicle monitoring devices 100-109 connected to the controller 20.

In addition, the system 10 includes a single display in the form of a single in-cabin display 304 connected to the controller 20, wherein the single in-cabin display 304 is adapted to be located in the vehicle 112 and display information in response to the outputs from the controller 20. The displayed information may include alerts and alarms to update a driver or occupant of the vehicle in relation to the status of the vehicle or the surrounding area.

The single in-cabin display 304 includes a human-machine interface. The single in-cabin display 304 is an aftermarket or non-OEM (Original Equipment Manufacturer) display to be installed in the vehicle.

The single in-cabin display 304 is the only display connected to the controller and is the only display connectable to the controller at any one time.

The vehicle 112 is preferably a heavy vehicle, such as a bus, crane, truck, port equipment or mining equipment, for example.

The vehicle monitoring devices 100-109 take the form of aftermarket vehicle monitoring devices and OEM vehicle monitoring devices present in the vehicle.

Similarly, the single in-cabin display 304 comprises an aftermarket or non-OEM (Original Equipment Manufacturer) display to be installed in the vehicle 112.

The vehicle monitoring devices 100-109 are safety devices and/or mitigations devices for monitoring a state of the vehicle and vehicle components and/or an area about a vehicle (particularly a heavy vehicle) and/or a state of a driver.

The plurality of connection interfaces 22 of the controller 20 include one or more of an RS232 connection, a BLUETOOTH® (short-range wireless communication) receiver, a CAN Bus, a Wi-Fi receiver, a digital I/O, an analog I/O, and an ethernet connection.

In the illustrated embodiment, the plurality of connection interfaces 22 of the controller 20 includes a CAN Bus interface for connecting to the vehicle network of the vehicle 112 to integrate the controller 20 with the existing (e.g. OEM) devices of the vehicle 112. In this regard, the controller 20 comprises a CAN Bus interface for connecting to OEM systems of the vehicle 112 through the CAN Bus 111 of the vehicle 112. Data being generated and transmitted by the various components of the vehicle 112 can be read through the connection of the controller 20 to the CAN Bus 111 of the vehicle 112 and decoded using an industry standard protocol (e.g., J1939).

The controller 20 is monitoring the link to the remote device in the form of the cloud server 113 for incoming messages which may include remote configuration changes in the form of action rules 24, firmware updates and time synchronisation data.

The controller 20 connects to both the vehicle CAN Bus 111 and aftermarket (non-OEM) vehicle monitoring devices 100-109 to provide enhanced safety and monitoring.

The controller 20 is configured to receive and process inputs 26 in the form of electronic signals from the vehicle monitoring devices 100-109 that would otherwise not be readily compatible with the vehicle. In this regard, the controller 20 provides "plug and play" functionality for a wide range of vehicle monitoring devices. To facilitate this functionality, the controller 20 receives configuration data that reconfigures and updates the controller 20 to allow the controller 20 to interface with and process signals received from vehicle monitoring devices, and then generate outputs based on the signals received from those vehicle monitoring devices to control the vehicle and the single in-cabin display.

In response to connection of a new or additional vehicle monitoring device, the processor 200 of the controller 20 wirelessly accesses the cloud server 113 (or receives data from the cloud server 113) and thereby obtains instructions executable by the processor 200 of the controller 20 to enable the controller 20 to process inputs received from the new or additional vehicle monitoring device and generate outputs based on the inputs.

The outputs 27 include at least one of an electronic signal to control the vehicle, a status corresponding to the vehicle monitoring devices 100-109, an alert, an audible warning and a visual warning displayed on the in-cabin display 304. The outputs displayed on the single in-cabin display 304 are user interactive to allow an operator to acknowledge and/or clear alerts.

The controller 20 also wirelessly receives commands from the cloud server 113 to update firmware and/or software of the vehicle monitoring devices 100-109 connected to the controller 20 to allow the action rules 24 to be reconfigured and updated. As an example, the action rules 24 relating to when automatic braking should be enabled and a proximity alert for a radar sensor should be generated on the display may be changed from 2 m to 1 m by wirelessly transmitting an updated set of action rules 24 from the cloud server 113 to the controller 20. The controller 20 may also receive the commands through a wired connection in some embodiments.

The controller 20 stores the inputs 26 from the one or more vehicle monitoring devices 100-109 and the outputs 27 in the memory storage 202 and/or wirelessly transmits the inputs (including a timestamp and/or a geotag assigned to the inputs by the controller 20 upon receipt from the vehicle monitoring devices 100-109) from the vehicle monitoring devices 100-109 and the outputs from the controller 20 to a telematics hub 306. In one example of use, the provision of the alerts or activations of the vehicle monitoring devices 100-109 to the telematics hub 306 allows for transparency and investigation of repeated activations of the vehicle monitoring devices 100-109. Furthermore, the transmission of the inputs 26 and outputs 27 received and generated by the controller 20 to the telematics hub 306 provides for a secondary source of that data in the event that the vehicle or controller 20 is destroyed (in a fire, for example) causing the data held on the controller 20 to be lost.

In the illustrated embodiment, the vehicle monitoring devices 100-109 comprise a radar sensor 100, a brake pressure sensor 101, a driver fatigue monitor 102, a seat switch 103, a door switch 104, video cameras 105, a GNSS receiver 106, an air quality monitor 107, an RFID scanner 108 and a tyre monitoring system 109, as shown in FIG. 1. However, it will be appreciated that these are only examples of vehicle monitoring devices that can be connected to the controller.

The controller 20 is configured to record timestamped data 23 using the inputs 26 generated by the vehicle monitoring devices 100-109 and the internal clock 201 in system storage 202. The timestamped data 23 includes timestamped actions and events. The controller 20 also includes a battery to maintain the internal system clock 201. In the illustrated embodiment, the battery takes the form of a rechargeable battery 204 adapted to recharge upon ignition of a battery of the vehicle 112.

The controller 20 is programmed to scan and monitor inputs 26 to the controller 20 and compare the states of the vehicle monitoring devices 100-109 against the action rules 24, which take the form of programmed settings, contained within system storage 202. Also stored in the system storage 202 is executable code that is loaded into RAM (random access memory) 203 on power-on and processed by the processor 200. The code provides a platform which includes at least an operating system, software drivers for other system components, drivers for communicating with external devices (such as the single in-cabin display) and a method of accessing a rules file to determine appropriate actions to take when specified conditions are met.

As noted above, the system 10 records timestamped data 23 in the form of the inputs 26 from the vehicle monitoring devices 100-109 and actions and events corresponding to the outputs 27 generated by the controller 20 (e.g. event data, warnings and activations of the vehicle monitoring devices) with a corresponding timestamp. This allows access for proof of compliance checking via the telematics hub 306 or wirelessly via Wi-Fi, BLUETOOTH® (short-range wireless communication) or CAN bus to a smart phone or tablet. This accurate timestamping is achieved by an internal system clock 201 that can continue to maintain correct time without external power, using the internal backup battery 204. As described above, this rechargeable battery 204 is recharged when the controller is connected to vehicle-supplied power when the ignition of the vehicle is on.

In some embodiments, the timestamped data 23 provided to the telematics hub 306 can be used to generate fleet dashboards of alerts and notifications when they occur, automatic and customisable reports, define rules for use of the vehicle monitoring device (e.g. establish a geofence around dispatch yard and to alert a dispatch centre if a vehicle leaves the yard without a safety check of a specific vehicle monitoring device to ensure the vehicle monitoring device is working before the vehicle leaves the yard), compliance tools to provide real time information so as to ensure that the vehicle monitoring devices are being used correctly, and if an event occurs then the data communicated between the controller and the telematics hub provides tracking data, a timeline and any recorded alert for forensic reporting to appropriate persons.

Data provided from the vehicle monitoring devices 100-109 can also be cross-referenced with output data to assist with identifying the cause of adverse events.

To monitor and react to vehicle movements (for example, for safety monitoring or security alarms) the controller 20 also includes an accelerometer 205.

The controller 20 continuously monitors the inputs 26 and compares these to the set of action rules 24 (e.g., programmed settings), to determine if an output 27 action is required.

A wide range of devices can be connected to the output stage of the controller 20 to effect control of those devices. The controller 20 is designed with sufficient power handling capacity to directly drive components of the vehicle 112, such as relays 300, solenoids 301, small motors 302 and indicator lights 303, for example, to control the vehicle 112 in response to the outputs generated by the CPU 200.

An audio alarm 307 can also be connected to the controller 20 to act as an additional output. The audio alarm 307 may also be built in to the single in-cabin display 304.

To indicate system status to the machine/vehicle operator, the controller 20 transmits messages, according to a defined communication protocol, to the single in-cabin display 304 located in the cabin of the vehicle 112. The single in-cabin display 304 reacts to these messages (by generating a display) to inform the operator of one or more actions taken by the controller 20. In addition, these actions are stored in system memory 202, and later transmitted to a remote cloud server 305 and/or a telematics device 306.

In use, the controller 20 receives inputs 26 in the form of electronic signals from or relating to the door switch, sear switch, gear position lever, park brake, actuator pressure values, accelerator and service brake pedals, and the vehicle speed via the CAN Bus 111 of the vehicle 112 and the vehicle monitoring devices 100-109. The inputs are received at the CPU 200 and processed based on the action rules 24. In this example, if the electronic signals relayed to the controller 20 indicate that the park brake is not applied, the seat switch indicates the driver seat is unoccupied, the driver door is open, no pressure is being applied to the accelerator and service brake pedals and the vehicle speed is below a certain threshold value (e.g. 6 km/h), based on the action rules 24, the controller 20 identifies that there is an unsafe parking condition and generates an output 27 (in the form of a signal) to activate a brake solenoid (e.g., solenoid 301 in FIG. 1) which activates the park brake to prevent the vehicle from rolling away. An additional output signal is generated to cause the single in-cabin display 304 to display a visual alert, such as a flashing red screen, for example. An audible alert may also be generated to provide additional warnings. The actions instructed by the controller 20 and the signals received as inputs which caused that action to be taken are transmitted to the telematics hub 306 for offsite recording, analysis and investigation.

Figure 2:
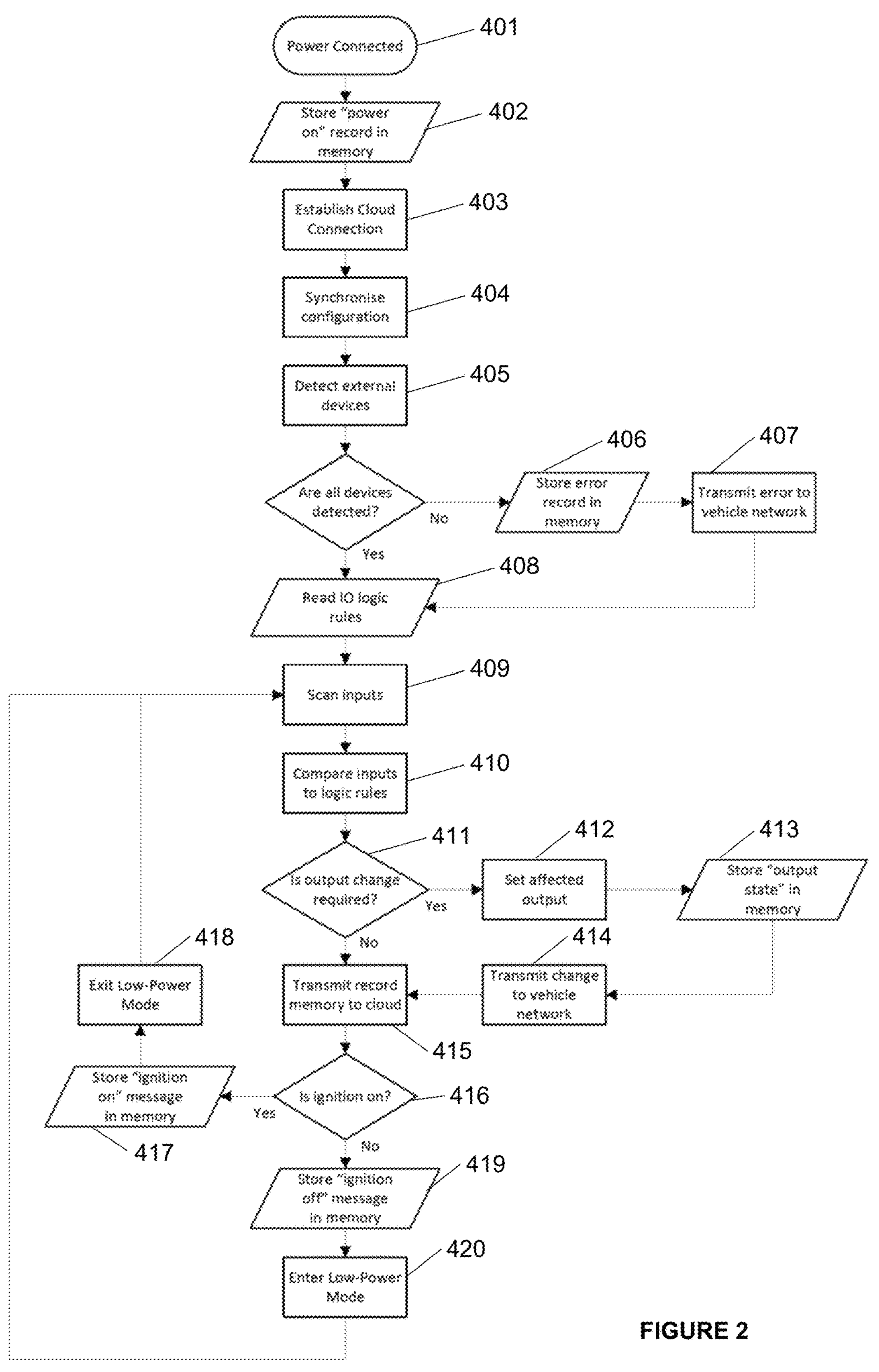
FIG. 2 illustrates a method for installing, operating and configuring aftermarket vehicle safety systems according to an embodiment of the present invention.

Referring now to FIG. 2, there is illustrated a method of installing, operating and configuring aftermarket vehicle monitoring devices in a vehicle using the system described above and shown in FIG. 1.

Firstly, operation of the controller 20 commences at 401 when power is connected from the power supply of the vehicle 112 to the controller 20. The internal code is loaded into random access memory 203 and the CPU 200 of the controller 20 begins processing.

Next, at step 402, the initialisation action is recorded in internal memory 202 in the system log.

Following system start-up, at step 403, the controller 20 establishes a connection with a remote server (i.e. the cloud server 113). This allows the controller 20 to perform a range of actions at step 404, including remotely synchronising configuration changes (i.e. updated action rules), checking for firmware updates or time adjustments.

Subsequently, at step 405, the controller 20 scans for vehicle monitoring devices, as specified in its configuration specification 25. Put another way, the controller 20 scans for vehicle monitoring devices specified in a configuration specification 25 that are connected to the controller 20. If all vehicle monitoring devices in the configuration specification 25 are detected being connected to the controller 20, the method proceeds to step 408. Otherwise, the controller 20 identifies any vehicle monitoring devices specified in the configuration specification 25 not connected to the controller 20 and, at step 406, generates an error message that is stored in the memory and output to the single in-cabin display 304 and/or transmitted to the vehicle network of the vehicle 112 at step 407. This enables external devices, including the single in-cabin display 304, to receive and display the error message. However, the controller 20 will continue to function in a reduced capacity (by excluding the identified vehicle monitoring devices specified in the configuration specification 25 not connected to the controller 20 from operation), so that unaffected system functions can work as expected.

At step 408, the controller 20 reads action rules 24 (e.g. logic rules and instructions) stored in the memory for the vehicle monitoring devices specified in the configuration specification 25 connected to the controller 20 and polls the vehicle monitoring devices 100-109 specified in the configuration specification 25 connected to the controller 20.

During polling, the controller 20, at step 409, reads a state of each vehicle monitoring device 100-109, compares the state to trigger conditions specified in the action rules 24 at step 410, and determines whether an output action is required based on the comparison at step 411.

If the controller 20 determines an output action is required, the controller 20 references the action rules 24, determines the output 27, records the output action in the memory 202 at step 413, and generates an output 27 at step 414. The action (e.g. the output 27) may include transmitting an alert or image to the single in-cabin display 304 and/or to the vehicle network, and sending electronic signals to control components of the vehicle 112 *e* (e.g. sending an electronic signal to a solenoid to control the braking system of the vehicle).

At step 415, the system log of controller actions is transmitted to a remote server (e.g. a telematics hub 306) so that remote monitoring systems can be aware of recent actions.

At Step 416, the controller 20 checks an ignition status of the vehicle 112. This check may be performed at predetermined intervals or at the end of a specific sequence such as the one set out above.

If the ignition status of the vehicle 112 indicates an off status, the controller 20 records the off status in the memory 202 at step 417 and initiates a power saving mode at step 418 before returning to step 409. When the controller 20 enters the power saving mode, the controller 20 may disable one or more outputs to the vehicle network, disable the single in-cabin display 304, and/or place the controller 20 in a sleep mode with a periodic wake schedule.

If the ignition status of the vehicle 112 indicates an on status, the controller 20 records the off status in the memory 202 at step 419 and disables power saving mode at step 420.

The method may include the step of checking a voltage of a battery of the vehicle 112 (either at predetermined intervals or as part of a sequence).

If the voltage of the battery of the vehicle 112 is below a threshold value, the functions of the controller 20 are disabled with the controller 20 conducting a periodic polling of the voltage of the battery until the voltage is above the threshold value and reinstates functions of the controller 20.

Advantageously, the controller has software and firmware that can be remotely diagnosed and updated on each vehicle safety device, via the above protocols, is fully configurable via software, and allows plug and play of various existing and future vehicle safety devices and solutions.

Embodiments of the system allow for easy and quick setting up of the various vehicle safety systems via the controller.

The controller connects to an in-vehicle human machine interface (HMI) or display unit that displays graphic visual and audible warnings and instructions from the various vehicle safety systems. The single display also allows the driver to interact with the display by "swiping" screens rather than a clutter of varied information all on one screen view. Other interactions are available for the driver, for example 'push display to reset etc'.

Embodiments of the system provide a controller and a single in-vehicle display, which together, provide a system for connecting one or more of the said vehicle safety systems to the same controller device, which can be programmed through software running on a tablet computer connected to the controller. The safety devices and systems have outputs that can be provided through the in-vehicle display, and output to a telematics hub. The data sent to the telematics hub can be used by a vehicle safety management system to provide monitoring, warnings and alerts.

In compliance with the statute, the invention has been described in language more or less specific to structural or methodical features. The term "comprises" and its variations, such as "comprising" and "comprised of" is used throughout in an inclusive sense and not to the exclusion of any additional features.

It is to be understood that the invention is not limited to specific features shown or described since the means herein described comprises preferred forms of putting the invention into effect.

The invention is, therefore, claimed in any of its forms or modifications within the proper scope of the appended claims appropriately interpreted by those skilled in the art.

The invention claimed is:

1. A system for installing, operating and configuring aftermarket vehicle monitoring devices in a vehicle comprising:

a controller located in a housing, the controller being configured to initialize upon ignition of the vehicle, the controller including:

a plurality of connection interfaces corresponding to data communication protocols for connecting to one or more vehicle monitoring devices of the vehicle; and a memory storing instructions executable by a processor of the controller to:

load instructions from the memory into the controller after initializing the controller;

scan for vehicle monitoring devices specified in a configuration specification connected to the controller;

identify any vehicle monitoring devices specified in the configuration specification not connected to the controller; and generate an error message that is stored in the memory and output to a single display; and process inputs received from the one or more vehicle monitoring devices and generate outputs based on the inputs, wherein upon identifying any vehicle monitoring devices specified in the configuration specification not connected to the controller, the controller excludes the identified vehicle monitoring devices specified in the configuration specification not connected to the controller from operation, reading action rules stored in the memory for the vehicle monitoring devices specified in the configuration specification connected to the controller and polling the vehicle monitoring devices specified in the configuration specification connected to the controller, wherein, during polling, the controller reads a state of each vehicle monitoring device as the input, compares the state to trigger conditions specified in the configuration specification, and determines whether an output action is required based on the comparison and wherein if the controller determines an output action is required, the controller references the configuration specification, determines the output action, records the output action in the memory, and controls one or more of the plurality of vehicle output systems to generate the output, and wherein the controller is configured to receive commands from a remote device to configure the one or more vehicle monitoring devices connected to the controller; and the single display being connected to the controller and adapted to be located in the vehicle and display information in response to the outputs from the controller.

2. The system of claim 1, wherein the plurality of connection interfaces comprise one or more of an RS232 connection, a BLUETOOTH® receiver, a CAN Bus, a Wi-Fi receiver, a digital I/O, an analog I/O, and an ethernet connection.

3. The system of claim 1, wherein the controller is configured to network a plurality of the two or more vehicle monitoring devices together.

4. The system of claim 1, wherein the controller stores the inputs from the one or more vehicle monitoring devices and the outputs in the memory and/or wirelessly transmits the inputs from the one or more vehicle monitoring devices and the outputs to a telematics hub.

5. The system of claim 1, wherein in response to connection of a new vehicle monitoring device, the processor of the controller wirelessly accesses a server and obtains new instructions executable by the processor of the controller to process inputs received from the new vehicle monitoring device and generate outputs based on the inputs.

6. The system of claim 1, wherein the display comprises a human-machine interface.

7. The system of claim 6, wherein the outputs comprise at least one of a status corresponding to the one or more vehicle monitoring devices, an alert, an audible warning and a visual warning displayed on the display.

8. The system of claim 7, wherein the outputs displayed on the display are user interactive.

9. The system of claim 1, wherein the controller is further configured to wirelessly receive commands from a remote device to update firmware and/or software of the one or more vehicle monitoring devices connected to the controller.

10. The system of claim 1, wherein the remote device provides the commands wirelessly or through a wired connection.

11. The system of claim 1, wherein the one or more vehicle monitoring devices are safety devices and/or mitigations devices for monitoring a state of the vehicle and vehicle components and/or an area about the vehicle and/or a state of a driver.

12. The system of claim 1, wherein the instructions are executed by the processor responsive to initialization of the ignition of the vehicle such that an ignition status of the ignition indicates an on status.

13. A vehicle monitoring system comprising:

a vehicle having one or more vehicle monitoring devices connected thereto for monitoring various aspects of the vehicle and its surroundings;

a controller located in a housing, the controller including:

a plurality of connection interfaces corresponding to data communication protocols connected to the one or more vehicle monitoring devices of the vehicle; and a memory storing instructions executable by a processor of the controller to:

load instructions from the memory into the controller after initializing the controller;

scan for vehicle monitoring devices specified in a configuration specification connected to the controller;

identify any vehicle monitoring devices specified in the configuration specification not connected to the controller; and generate an error message that is stored in the memory and output to a single display; and receive inputs from the one or more vehicle monitoring devices and generates outputs based on the inputs and communicates the outputs to a secondary device;

wherein upon identifying any vehicle monitoring devices specified in the configuration specification not connected to the controller, the controller excludes the identified vehicle monitoring devices specified in the configuration specification not connected to the controller from operation, reading action rules stored in the memory for the vehicle monitoring devices specified in the configuration specification connected to the controller and polling the vehicle monitoring devices specified in the configuration specification connected to the controller, wherein, during polling, the controller reads a state of each vehicle monitoring device as the input, compares the state to trigger conditions specified in the configuration specification, and determines whether an output action is required based on the comparison and wherein if the controller determines an output action is required, the controller references the configuration specification, determines the output action, records the output action in the memory, and controls one or more of the plurality of vehicle output systems to generate the output, and wherein the controller receives commands from a remote device to configure the one or more vehicle monitoring devices connected to the controller; and the single display connected to the controller, wherein the display is located in the vehicle and display information in response to the outputs from the controller.

14. The method of claim 13, wherein following initialization, the controller attempts to establish a connection with a remote server, and upon connection with the remote server, the controller performs a check for configuration updates, firmware update and/or time adjustments.

15. The method of claim 14 including checking an ignition status of the vehicle at predetermined interval, wherein, if the ignition status of the vehicle indicates an off status, recording the off status in the memory and initiating a power saving mode, wherein the power saving mode includes disabling one or more outputs to the vehicle network, disabling the single display, and/or placing the controller in a sleep mode with a periodic wake schedule.

16. The method of claim 15, wherein if the ignition status of the vehicle indicates an on status, recording the on status in the memory and disabling power saving mode.

17. The method of claim 13 including checking a voltage of a battery of the vehicle, wherein if the voltage of the battery of the vehicle is below a threshold value, the controller is disabled.

18. A method of installing, operating and configuring aftermarket vehicle monitoring devices in a vehicle, the method including:

providing a controller including a plurality of connection interfaces corresponding to data communication protocols for connecting to a plurality of vehicle monitoring devices of the vehicle, and a memory storing instructions executable by a processor of the controller to process inputs received from the plurality of vehicle monitoring devices and generate outputs based on the inputs;

providing a single display connected to the controller, wherein the display is located in the vehicle and displays information from each of the one more vehicle monitoring devices in response to the outputs from the controller;

connecting the controller to the plurality of vehicle monitoring devices;

connecting the controller to a vehicle network of the vehicle;

receiving commands from a remote device to configure the one or more vehicle monitoring devices connected to the controller;

initializing the controller upon ignition of the vehicle;

loading instructions from the memory into the controller after initializing the controller;

scanning for vehicle monitoring devices specified in a configuration specification connected to the controller;

identifying any vehicle monitoring devices specified in the configuration specification not connected to the controller; and generating an error message that is stored in the memory and output to the single display;

receiving inputs from the plurality of vehicle monitoring devices;

processing the inputs and generating outputs based on the inputs, wherein upon identifying any vehicle monitoring devices specified in the configuration specification not connected to the controller, the controller excludes the identified vehicle monitoring devices specified in the configuration specification not connected to the controller from operation, reading action rules stored in the memory for the vehicle monitoring devices specified in the configuration specification connected to the controller and polling the vehicle monitoring devices specified in the configuration specification connected to the controller, wherein, during polling, the controller reads a state of each vehicle monitoring device as the input, compares the state to trigger conditions specified in the configuration specification, and determines whether an output action is required based on the comparison and wherein if the controller determines an output action is required, the controller references the configuration specification, determines the output action, records the output action in the memory, and controls one or more of the plurality of vehicle output systems to generate the output; and displaying information on the single display based on the outputs.

* * * * *